United States Patent [19]

Colgate, Jr.

[11] Patent Number: 6,086,708
[45] Date of Patent: Jul. 11, 2000

[54] HOLOGRAPHIC CHECK AUTHENTICATION ARTICLE AND METHOD

[76] Inventor: Gilbert Colgate, Jr., 120 E. 89th, New York, N.Y. 10128

[21] Appl. No.: 08/841,319

[22] Filed: Apr. 30, 1997

Related U.S. Application Data

[60] Division of application No. 08/266,594, Jun. 28, 1994, Pat. No. 5,634,669, which is a continuation-in-part of application No. 07/933,015, Aug. 20, 1992, abandoned, which is a continuation of application No. 07/685,405, Apr. 16, 1991, abandoned.

[51] Int. Cl.[7] ............................................. B32B 31/00
[52] U.S. Cl. ...................... 156/277; 156/231; 156/233; 156/238; 156/240; 156/271; 283/57; 283/58; 283/59
[58] Field of Search .................... 156/277, 231, 156/233, 238, 240, 271; 283/57, 58, 59; 427/256

[56] References Cited

U.S. PATENT DOCUMENTS

| | | | |
|---|---|---|---|
| 4,184,700 | 1/1980 | Greenaway | 283/91 |
| 4,421,380 | 12/1983 | McGrew | 359/23 |
| 4,522,428 | 6/1985 | Small et al. | 283/82 |
| 4,576,850 | 3/1986 | Martens | 156/272.2 |
| 4,591,707 | 5/1986 | Stenzel et al. | 283/58 |
| 4,631,223 | 12/1986 | Sander | 156/233 |
| 4,684,795 | 8/1987 | Colgate, Jr. | 156/240 |
| 4,728,377 | 3/1988 | Gallagher | 156/233 |
| 4,758,296 | 7/1988 | McGrew | 156/231 |
| 4,763,927 | 8/1988 | Schneider | 283/70 |
| 4,832,445 | 5/1989 | Haines et al. | 283/91 |
| 4,840,757 | 6/1989 | Blenkhorn | 156/232 |
| 4,856,857 | 8/1989 | Takeuchi et al. | 324/555 |
| 4,877,717 | 10/1989 | Suzuki et al. | 430/321 |
| 4,913,504 | 4/1990 | Gallagher | 359/1 |
| 4,921,319 | 5/1990 | Mallik | 283/91 |
| 4,943,093 | 7/1990 | Melling et al. | 283/91 |
| 4,944,532 | 7/1990 | Pollard | 283/70 |
| 4,971,646 | 11/1990 | Schell et al. | 156/277 |
| 5,015,318 | 5/1991 | Smits et al. | 156/233 |
| 5,073,221 | 12/1991 | Waitts et al. | 156/238 |
| 5,137,991 | 8/1992 | Epstein et al. | 525/540 |
| 5,248,544 | 9/1993 | Kaule | 283/86 |
| 5,267,753 | 12/1993 | Chock | 283/54 |
| 5,370,763 | 12/1994 | Curiel | 156/277 |

FOREIGN PATENT DOCUMENTS

WO9300224  1/1993  WIPO.

OTHER PUBLICATIONS

The Common Machine Language For Mechanized Checks Handling, Final Specifications and Guides, Apr. 1959, Part II, pp. 13–19.
A Progress Report, Mechanization of Check Handling (Supplement) Supplement to Part III of Bank Management Publication 147, no date given.
Understanding and Designing Checks, 1990, pp. 6–20.
American National Standard (Paper Specifications for Checks), Mar. 9, 1993, pp. 1 and 5–6.

*Primary Examiner*—Deborah Jones
*Assistant Examiner*—Robert R. Koehler
*Attorney, Agent, or Firm*—Liniak, Berenato Longacre & White

[57] ABSTRACT

A method of making a document, such as a check or stock certificate, having enhanced security against counterfeiting. The document includes a strip of foil having a three dimensional light diffracting image thereon affixed to the document. The strip of foil may be affixed to the document before or after the background printing or face printing of the document is completed. In this manner, the light diffracting strip may be printed on by the background and face printing of the document as desired.

20 Claims, 7 Drawing Sheets

HOLOGRAPHIC CHECK AUTHENTICATION ARTICLE AND METHOD

This is a division of application Ser. No. 08/266,594, filed Jun. 28, 1994, now U.S. Pat. No. 5,634,669, which is a CIP of Ser. No. 07/933,015 filed Aug. 20, 1992, now abandoned, which is an FWC of Ser. No. 07/685,405 filed Apr. 16, 1991 now abandoned.

BACKGROUND OF THE INVENTION

1. Field of the Invention

The invention relates to a method of producing a document of paper, plastic or the like, such as a checks, currency, stock certificate decal, or other documents of value which can be authenticated and has enhanced protection against illegal copying, and to such a document.

2. Description of the Prior Art

No document of value exists which can completely avoid being counterfeited, nor will such a document ever likely exist. The entire history of efforts to thwart counterfeiting is of an effort to make counterfeiting difficult, expensive and economically discouraging, not to make it impossible.

Many checks now in use have become bearer documents for which the bearer is entitled to exchange cash. Traveller's checks are one prominent example. As the number of checks in circulation continues to increase, and banks are forced to pay more quickly on ordinary checks, all checks are becoming to some extent bearer instruments as a practical matter. For these kinds of instruments the only tests for authenticity which are normally possible are those which can be carried out by the person doing the exchange, i.e., the bank teller, or cashier. The most important test has always been, and will likely remain, visual observation of the document.

As the popularity of checks has increased so too the need for authenticating checks has grown to crisis proportions. Armed with photo copiers and laser scanners, almost all the prior anti-alteration and anti-copying and authenticating devices have been eviscerated. Void pop-outs no longer pop out. The basket weave background printing no longer serves to prevent the color copier from creating virtually perfect copies of checks.

Intaglio printing which leaves distinctive ridges of ink on the paper is a popular anticounterfeiting technique, but is too expensive for use on every day checks. Intaglio printing has instead been reserved for documents of limited application and where counterfeiting, if accomplished, would have profound consequences.

The industry is concerned that copying has gotten out of control. Some banks, Barclay's for example, have adopted a hot stamped hologram on their check. The security of the hologram serves the purpose extremely well. However, the intermittent stamping operation adds significant cost to the check manufacturing process and is not economical (even granted the ballooning losses in the industry) for incorporation into the 50 billion or so checks which clear the system in the United States each year.

Adding to the difficulties in providing secure checks are the rules and regulations for printing bank checks which have been refined over the years. These rules are both exacting and intolerant. From the printer's point of view, the most significant consideration is probably the "clear band" an area at the bottom of the check where no extraneous ink may be visible. It is in this clear area where the MICR (magnetic ink character recognition) numbers are printed and which determine the routing and eventual payment of the check. Whether a personal check, a corporate or bank check or a traveler's check, all have this clear area.

Placing on security documents images which are difficult to replicate has been employed as one technique to make counterfeiting as difficult as possible. Most notably, small holographic image have been placed on plastic credit cards. These pieces are stamped from strips of foil on which holographic images have been "printed" or embossed by a stamping process.

These images are difficult to reproduce from a technical standpoint, although not necessarily expensive. The deterrent effect primarily is that a successful counterfeiter must have not only a sophisticated capability in the printing arts, but an equal level in the holographic art. And of course, holographic works are very effective in facilitating authentication by visual inspection and cannot be successfully replicated using photocopy technology.

However, simply placing a piece of foil having a holographic image embossed thereon on each check or placing a transparent layer over the check after printing is not an optimum solution. Cost is of paramount concern, as is disrupting as little as possible the printing procedures now in effect. Moreover, the space on the front of a check is limited, and placement on the reverse side of the check may mean that the person accepting the check may not inspect the strip.

Holograms have also been used on other documents. For example, U.S. Pat. Nos. 4,728,377 and 4,913,504 describe use of a hologram on documents. These U.S. patent documents are incorporated herein by reference thereto as background art.

Prior art FIG. 8 illustrates a conventional hot stamping holographic foil 1 wherein a polyester carrier 2 is provided with a waxy release layer 3. Further a scuff coat 4 is provided between the waxy release layer and an embossment coat 5. The embossment coat 5 is embossed at 5a, then metalized at 5b and provided with a tie coat 6. An adhesive layer 7 is then provided on the tie coat 6 for adhesion to a document or substrate (not shown).

Significantly, the American Bankers Association (ABA) has recognized the need for security features to prevent fraud through the copying or counterfeiting of checks. When addressing security features, the ABA states "any security technique that will help prevent check fraud by counterfeiters or copiers is desirable, as long as it does not impair the processing characteristics of the document".

Significant to the security problems encountered with check production and counterfeiting are the ABA rules, and the "American National Standard, Paper Specifications for Checks" which set forth specifications governing the automation of bank operating procedures. The ABA/ANSI rules outline the dimensional specifications for the printed image of the characters to be used, the type and form paper to be used, horizontal and vertical field boundaries, minimum and maximum check sizes, and printing tolerances.

There are three primary considerations when adding a security feature to a roll of checks for security purposes: first, the ABA rules on check printing require a "clear band" extending along the bottom ⅝" of all checks whereby no magnetic ink is permitted within the clear band; second, the ABA rules on check printing restrict embossment or impression on the check surface and state that embossment should not exceed 0.001 inches; and third, the ANSI/ABA Paper Specifications for Checks states that paper-plastic combinations must not be used because strong static potential exists in processing documents of this nature due to the plastic portion of the laminate.

The prior art holograms described above fail to meet the stringent requirements with regard to check production as promulgated by the ABA and ANSI.

The ABA rules require a 5/8" clear band at the bottom of the check because automated MICR reading equipment is very sensitive, and the magnetic ink has a very weak magnetic flux. Thus, the ABA enacted the rules of check printing to protect the detectability of the MICR numbers. Indeed, the clear band has become sacrosanct over the years, and while some checks have lightly printed backgrounds or the old fashioned "basket weave" pattern in the clear band and travelers checks offer a border of reduced size, generally this area has been off limits to printers.

Moreover, the ABA rules on check printing set forth embossment (impression) standards whereby the embossment is not permitted to exceed that which has a depth not more than 0.001. Prior methods of embossment result in embossments which exceed the ABA embossments standards for check printing.

The American National Standard, Paper Specifications for Checks specifically states that paper-plastic combinations must not be used because of the strong static potential which causes feeding problems in high speed sorting equipment. These paper specifications are necessary for the efficient handling of paper documents which must survive as many as 30 passes through the sorting equipment.

The need thus exists to thwart the counterfeiting of checks and other secure documents, and to provide a relatively inexpensive and practical method which adheres to all ABA and ANSI standards governing check design.

SUMMARY OF THE INVENTION

The present invention provides a method of creating a security document which not only virtually eliminates the chance of counterfeiting, but passes the stringent ABA and ANSI standards of check production. Moreover, the present invention maintains a simplicity in form while providing an economical solution to current counterfeiting problems.

Specifically, the instant invention provides a holographic image in the form of a foil strip which is virtually impossible to counterfeit. The foil strip is formed with a metalized layer which does not disturb the 5/8" clear band provided on the bottom of checks, the foil strip is so thin that it does not interfere with the reading head of optical reading equipment, and by omitting the plastic layer taught by the prior art, the foil strip meets the ANSI paper-plastic specifications for check production.

Applicant has discovered that the optical strip of the invention satisfies the rules and regulations governing check design as set forth by the ABA while maintaining excellent optical properties necessary for security documents. The optical image itself is cast into a varnish of an oligomer about three micron in depth. Being aluminum, the reflective foil strip does not interfere with the magnetic check reading equipment; and being holographically reflective, the foil strip reads as "white" in those instances where banks use optical reading equipment.

Therefore, the 5/8" clear band provided on checks is not disturbed by the optical strip of the present invention. In addition, the application of the aluminum layer according to the present invention meets the ABA standards for embossing. Moreover, applicant's customers have tested, the striped checks set forth by the present invention for the ANSI/ABA required 30 runs through sorting equipment and without exception has passed with flying colors.

The foil strip of the instant invention is so very thin that it does not interfere with the reading performance of optical reading equipment which reads the MICR print. To the applicant's knowledge, only the foil strip of the present invention has the attributes satisfying the rules of check printing; thus allowing the foil strip to extend into the clear band.

Due to unique characteristics of the invention, its benefits are not limited solely to checks, but encompass a wide variety of security documents, i.e. currency, in which optical verification is paramount.

The following is a description of the invention which is not intended to limit the scope of the invention but rather describe the preferred embodiment thereof. The description includes claims and drawings forming a part thereof.

DETAILED DESCRIPTION OF THE PREFERRED EMBODIMENT

Figure 1:
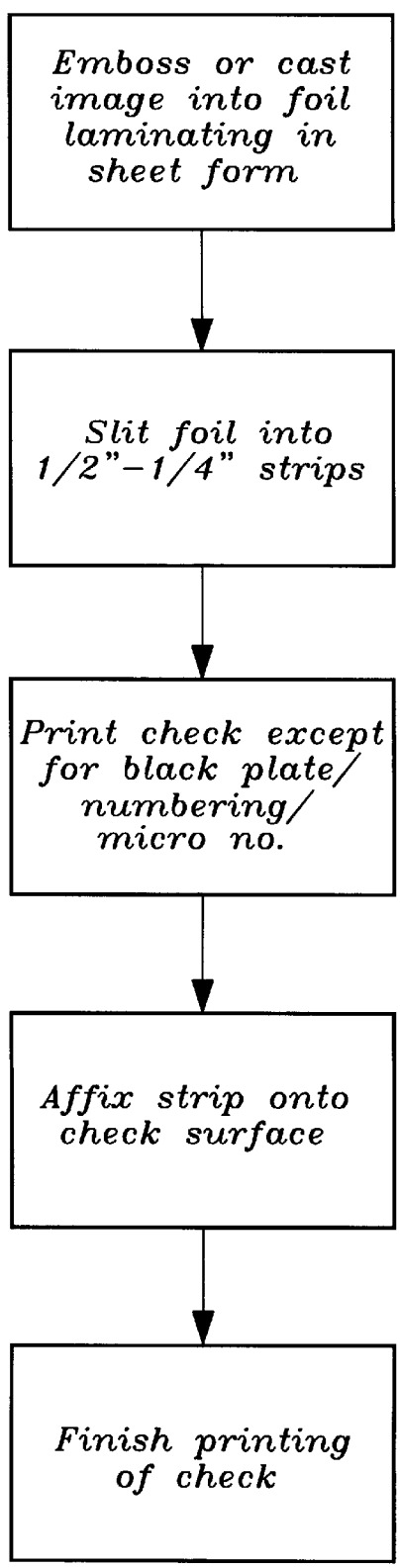
FIG. 1 shows a block diagram of the method of the present invention.

Referring to FIG. 1, in the process of the present invention, first a holographic image is embossed or casted onto a roll of foil in sheet form which is typically 30"–50" wide. The sheet of foil is then slit into 1/2"–1/4" strips. The foil strips are then affixed onto the check surface in an automated manner such that the foil strip is continuously rolled onto a series of checks. It is noted that the background of the check is printed on ordinary paper used for check writing, and that the printing may occur before or after affixation of the foil strip. If the background information/design is printed after the foil strip is affixed, the foil strip will carry the background image thus further enhancing security.

Figure 2:
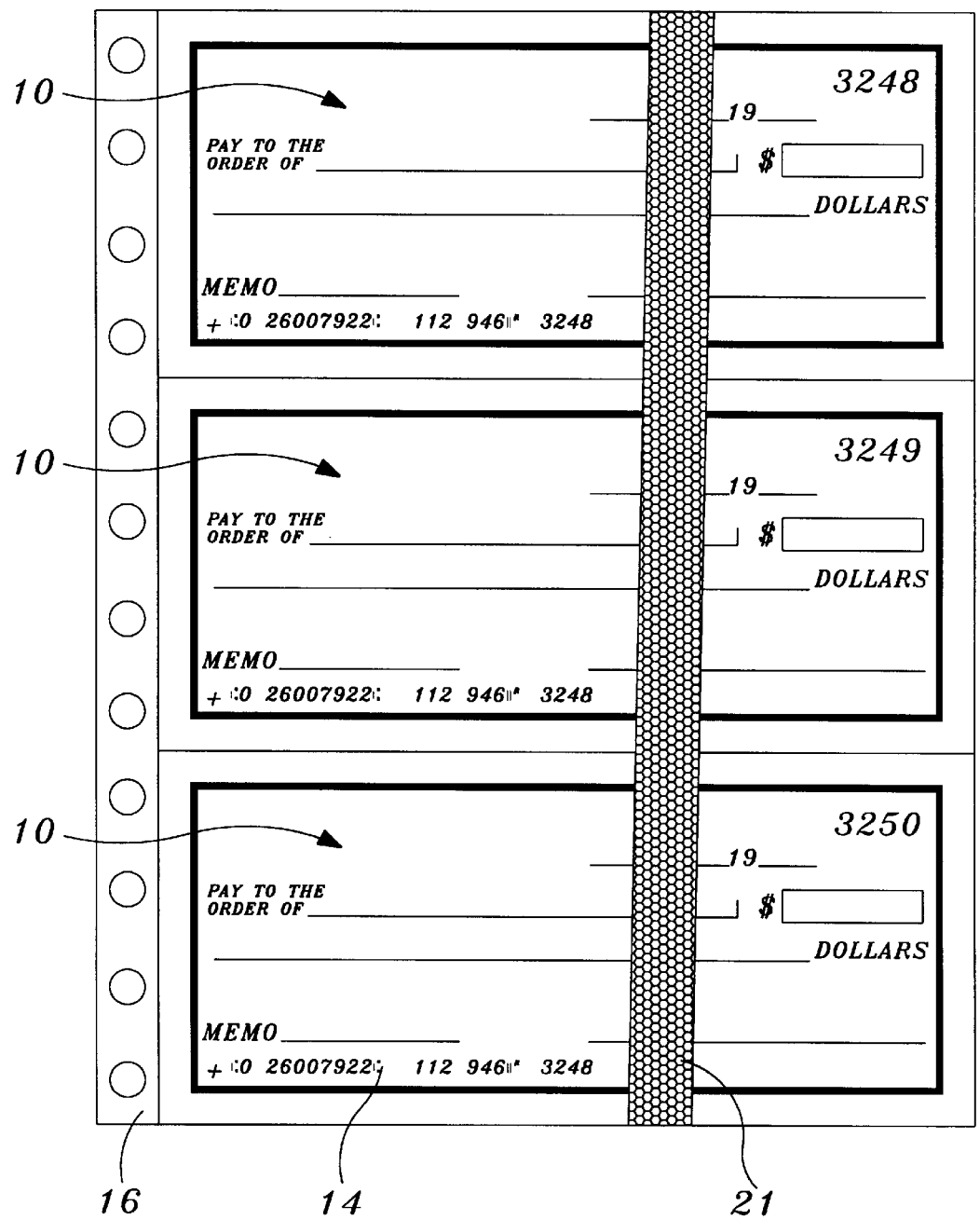
FIG. 2 shows an example of a series of checks produced according to the present invention.

FIG. 2 illustrates an example of a series of checks printed through the method described above whereby the background image is printed prior to affixation of the, foil strip 21. Each check 10 of FIG. 2 comprises a clear band area 14 extending along its bottom width, and line holing 16 for automated handling. The foil strip 21 extends across the series of checks 10 so as to form a continuous strip which is later perforated with the check so that the checks can be separated for individual use.

Figure 3:
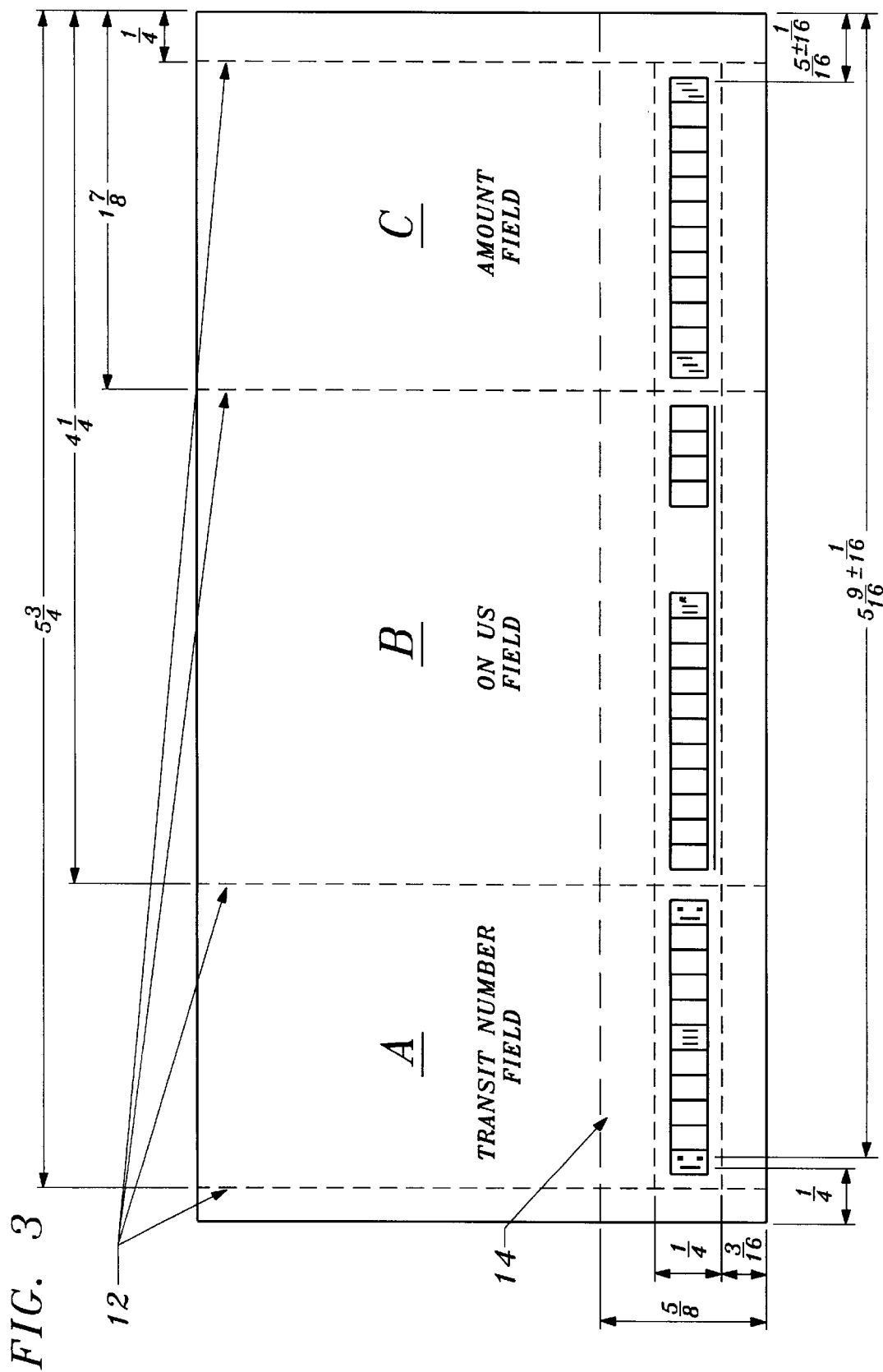
FIG. 3 is a check which adheres to the standard format as set forth by ABA specifications and guidelines.

The standard format for paper checks as set forth by ABA specifications and guidelines will now be described with reference to FIG. 3. As shown in FIG. 3, the check 10 is provided with three different fields defined by boundary lines 12. The transit number field A contains information describing the routing information for electronic check processing. The on us field B contains information describing the account information. The amount field C contains information describing the amount of the check.

Various dimensions are also set forth by the ABA, the most critical of which for the purposes of this application is the clear band 14 extending along the bottom of the check which must be at least ⅝ of an inch wide.

The foil described below begins as a foil sheet 20, is then slit into strips 20' and affixed to paper 30. After being affixed to the paper 30, a polyester carrier 24 is removed to leave a foil stripe 21 on the paper substrate.

Figure 4:
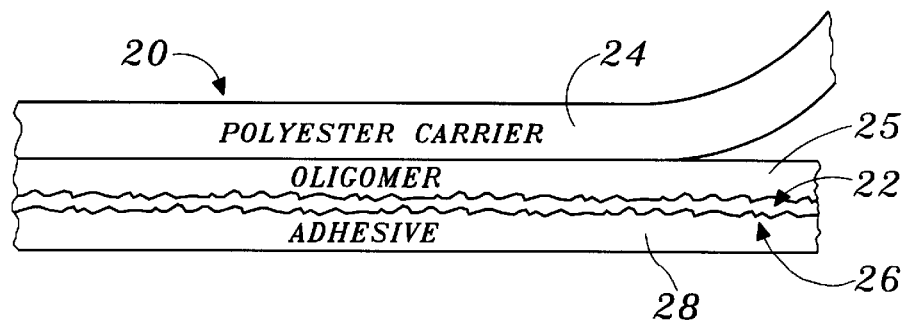
FIG. 4 shows a cross section of the cast foil material for check striping as set forth by the invention.

With reference to FIG. 4, the preferred method of forming the pre-affixed foil sheet 20 is to cast a three-dimensional image 22 of such fineness that the light diffracts (i.e. 800–900 lines to the millimeter, minimum) along with a unique pattern which can be identified by the viewer, for example as the logo of the issuer. The casting comprises 3 microns of an oligomer 25 using a gravure type reverse doctor blade for uniformity of coating. The type of oligomer 25 used in the preferred method may be the curable varnish "Radcoat #801", which is commercially available from the Radcure Company, because it cures on polyester but releases from it. The casting is to a polyester film 24 of 1 mil without a corona treatment. If a corona treatment is used the oligomer will stick to the polyester and not transfer to the check paper.

After casting, the entire film 20 (30 plus inches wide) is metalized with aluminum (vacuum deposition is the preferred method) to a coating depth of generally one ohm (less than 1000 angstroms, most often about 160 angstroms) to form a metalized film 26. This minimum layer of aluminum provides sufficient reflectivity but minimizes the chances of flaking at the edges and thereby possibly gumming up the check reading equipment with flakes of aluminum.

The next step is to coat the metalized film 26 with a standard hot melt adhesive 28 (again, without a corona treatment). Then, the foil sheet 20 is slit to obtain ¼" to 1" foil strips 20'; the width depending on the printing requirements. The slitting can be either a pancake form or, better, a traverse roll. The slitting equipment is standard and available commercially, although the practice of slitting requires skill.

After the foil strips 20' are manufactured, the major problem is to provide a method for adhering it to the paper. There are no standard pieces of equipment to do, this for document striping. In the preferred mode the check striping material is not, strictly speaking, a hot stamping foil. It is a unique and far more simpler construction and, for that reason less expensive. As shown in FIG. 4 and described above, the laminate or foil strip 20' consists of the polyester film carrier 24 without a release coat; merely adhered by the formulation of the oligomer 25 to the polyester, the embossing 22 (less than a quarter micron on average), the metalization 26 and adhesive 28.

Figure 5:
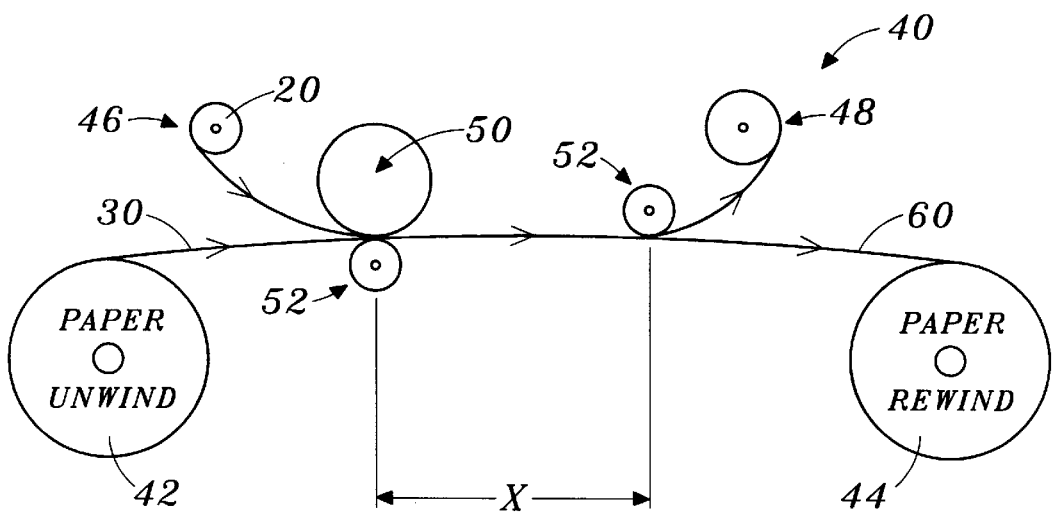
FIG. 5 illustrates the equipment used to perform the striping method of the invention.

The equipment built to lay in the check stripe material to the document surface will be described with reference to FIG. 5. The equipment 40 consists of an unwind stand 42 for the rolls of raw paper 30 and a rewind stand 44 for receiving the striped paper 60 with the foil stripe 21 affixed thereto. The raw paper 30 is transferred from the unwind stand 42 to the rewind stand 44 through laydown and takeup spools, 46 and 48, respectively. The laydown spool 46 maintains a roll of the checkstripe material 20'. The takeup spool 48 receives the released polyester carrier 24 which is removed from the laminate or foil strip 20' after the strip 20' adheres to the paper 30.

In between the laydown and takeup spools 46, 48 are two rollers 50, 52; the top roller 50 is a heated roller and the bottom roller 52 a chilled roller. There are often additional sets of guiding rollers and, several feet past the chill roller 52, an additional chill roller 52' removes the polyester carrier 24. It is noted that the distance X between the initial adhesion of the check stripe material to the paper at rollers 50, 52 and the second chill roller 52' which removes the polyester carrier must be sufficient to allow adhesion to occur.

When the above equipment is utilized to lay down a strip 20', the printer is left with a striped paper roll 60 wound on the paper rewind roll 44 on which a number of ¼" (nominally) stripes 21 of reflective holographic imaged material is affixed, in rows equal to the number-out of document to be eventually printed from the roll of paper 60.

Figure 6:
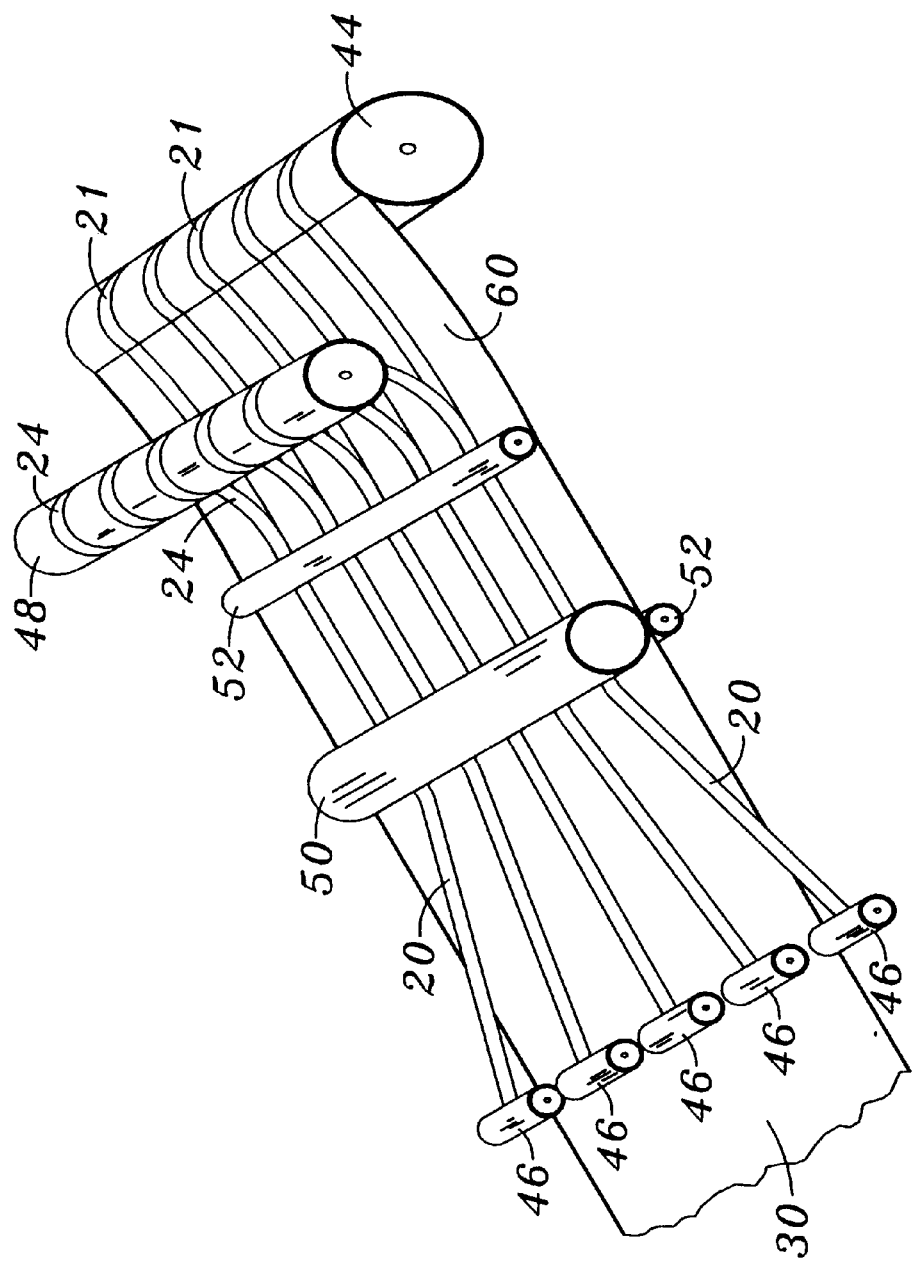
FIG. 6 is a perspective view of the equipment shown in FIG. 5.

The general layout of the above equipment in perspective view is shown in FIG. 6. In the preferred embodiment, a number of layout spools 46 apply strips 20' to the raw paper 30 which pass between the top heated roller 50 and the bottom chilled roller 52. For example, if the roll 30 is 17" wide and it is expected there will be two rows of 8½" checks printed, then the two stripes will be (for example) 1"from the left edge of the roll and another 9½" from the left edge.

Figure 7:
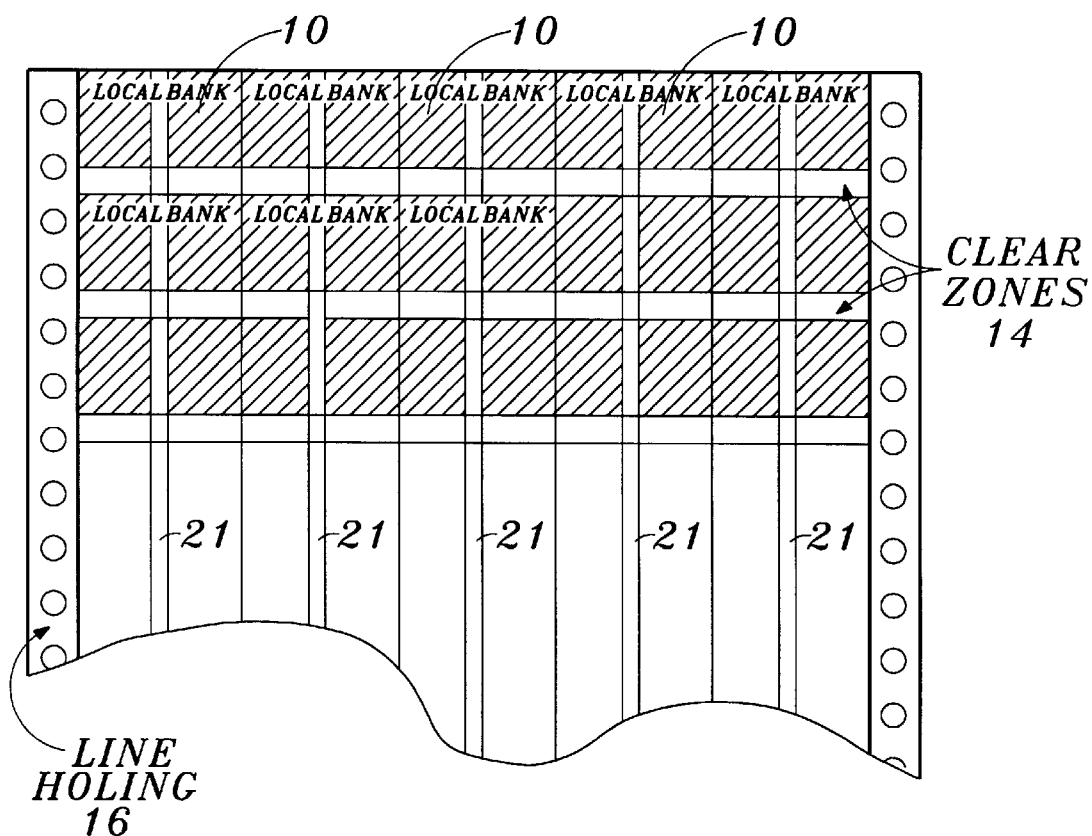
FIG. 7 is an illustration of a sheet of checks printed with an optical stripe as described by the invention.
Figure 8:
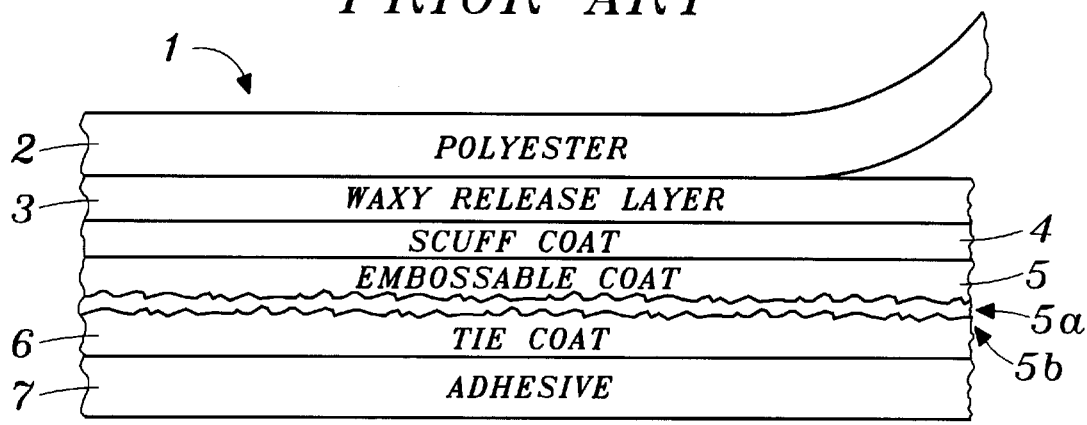
FIG. 8 illustrates a conventional hot stamping holographic foil.

FIG. 7 illustrates the sheet of paper 60 with the optical stripes 21 affixed thereto. The sheet 60 of FIG. 7 comprises checks 10 in rows of five whereby the printing is placed over the stripe 21. The checks 10 are later singulated for conventional secure use.

The check paper is invariably 20# MICR bond (occasionally 24# MICR bond) . Checks are often printed 2 across, but sometimes more. If they are printed 4 out then one needs to stripe 4 stripes on the roll of paper.

The foregoing method of creating checks leads us to yet an even more economical method based on the same principles of this invention: that is to the paper maker itself. Here the idea is to introduce the check stripe material before the paper is finished. It requires additional rollers to lay in the check stripe material and take up equipment to spool up the carrier, however the temperatures at the head box in paper manufacturing (250°±) are consistent with the requirements for introducing the check-striping material into the paper at that time, and the converting equipment required is well within the paper manufacturers skills. The result will be the most economical method of check striping yet devised.

It is axiomatic that the "striped" paper 60 can be handled in virtually any way non-striped paper can be handled. The oligomer is print receptive and therefore can be placed in the middle of the check with the MICR numbering printed directly over it.

In another example, the holographic foil may be rolled on over the magnetic numbering (which is usually the last printing on a check). It has been demonstrated the magnetically printed numbers will read through the striped foil 21 which is normally several hundred angstroms thick without significant loss of magnetic strength. (The reflective metalization in this case is preferably aluminum or other high reflective non magnetic metal.) This method produces an additional security benefit as follows: the 2 or 3 numbers hidden under the holographic stamp are unreadable except by magnetic reading and are thus unavailable to the counterfeiter. In practice it is probable the stripe should cover only the beginning or bank I.D. #'s which are printed in magnetic ink. Very rarely MICR character will not read (i.e., the ink was wrong). In these cases, the bank hand encodes the misreading check. If an individual's account number is made invisible by being covered over with the magnetic stripe and if the check printer has printed an account number which does not read, it will be difficult and time consuming to charge the check to the proper account. On the other hand, if only the bank identification number is covered, that is readily available from various sources at the bank and will provide no great problem (besides the bank address is generally also printed on the check).

A side benefit to this invention is that instead of using check paper, one can also use a bank note paper from which currency is made. If one "stripes" the bank note paper then, after sheeting the paper to size, one can use the paper in an intaglio press and print the paper. One unique benefit brought to the process by this invention is the that oligomer (bereft of the carrier) has great resilience and resistance to scuffing and folding, but has virtually no substance and does not cause a pile of bills to bulge. Thus, the striping provides an anti-counterfeiting feature of unusual strength at the least possible additional cost. Generally, in currency, there is a border around the bill or note and while there are no rules prohibiting a stripe through that border there is an aesthetic consideration which may inhibit the use of this invention in currency. There is no such aesthetic consideration in the check industry. Price is the consideration in checks and, while very important, secondary in the currency industry.

Given the manufacturing of the stripe by the methods outlined results in large volume at low cost and the ability to slit large volumes exists in the market place, the development of striping equipment is the only bar to the widespread use of this invention in the check market.

Many changes and modification in the above described embodiment of the invention can of course be carried out without departing from the scope of the invention. Accordingly, that scope is limited only by the scope of the appended claims.

I claim:

1. A method of producing a document for use as a negotiable instrument having enhanced security against counterfeiting comprising the steps of:

providing a document for use as a negotiable instrument, said substrate having a clear band extending along a bottom edge of said document, said clear band having a depth of at least $5/8'$, said clear band being divided into at least three information fields, whereby a first transit-number field is adapted to receive magnetic information describing routing information for electronic processing of said document, a second on-us field is adapted to receive magnetic information describing account information, and a third amount field is adapted to receive magnetic information describing said specified amount;

forming a three dimensional light diffracting image on an optical strip;

continuously rolling said strip onto a surface of said document from a top edge to said bottom edge, wherein said strip is affixed to said surface of said document;

printing on said surface of said document, wherein a printed image overlies a common portion of said surface with said strip, said image extending beyond a boundary of said strip onto an additional portion of said surface of said document.

2. The method recited in claim 1, wherein said step of forming includes the step of casting said light diffracting image onto a layer of oligomer.

3. The method recited in claim 1 further including the step of printing a background image onto said surface before affixing said strip.

4. The method recited in claim 1 further including the step of cutting said strip into a strip of smaller width.

5. The method recited in claim 1 wherein said step of continuously rolling includes the step of affixing said strip to a series of said document surfaces.

6. The method recited in claim 5 wherein a portion of said strip remains affixed to each document surface of said series of said document surfaces after said documents are separated one from the other.

7. The method recited in claim 1, wherein said step of forming said light diffracting image comprises casting a light diffracting optically variable device onto a plastic carrier, creating a metalized side by applying a metallic layer to said optically variable device, and applying a heat set adhesive to said metalized side, wherein said plastic carrier is removed before said step of printing.

8. The method according to claim 7, wherein said plastic carrier comprises a layer of oligomer.

9. A method of producing a check having enhanced security against counterfeiting comprising the steps of:

providing a substrate, said substrate having a clear band extending along a bottom edge of said document, said clear band having a depth of at least $5/8"$, said clear band being divided into at least three information fields, whereby a first transit-number field is adapted to receive information describing a routing information for electronic processing of said document, a second on-us field is adapted to receive information describing account information, and a third amount field is adapted to receive information describing said specified amount;

forming a three dimensional light diffracting image on an optical strip;

printing magnetic information onto at least a portion of said clear band; and continuously rolling said strip onto said surface of said check base wherein said strip is affixed to said surface of said check base, said strip being positioned to extend from a top edge of the check to a bottom edge of the check and through said clear band.

10. The method recited in claim 9 further comprising the step of printing on said surface of said check across said strip, wherein a printed image is positioned on said strip.

11. The method recited in claim 9 wherein said magnetic information extends over a portion of said strip.

12. The method recited in claim 9 wherein said strip is positioned to overlay a portion of said magnetic information.

13. The method recited in claim 9, wherein said step of forming said light diffracting image comprises casting a light diffracting optically variable device onto a plastic carrier, creating a metalized side by applying a metallic layer to said optically variable device, and applying a heat set adhesive to said metalized side.

14. The method recited in claim 13, wherein said step of affixing said strip to said surface comprises applying a heated pressure roller to said strip, and removing said plastic carrier.

15. A method of producing a check having enhanced security against counterfeiting comprising the steps of:

providing a substrate adapted for use as a check, said substrate having a clear band extending along a bottom edge of said document, said clear band having a depth of at least $5/8"$, said clear band being divided into at least three information fields, whereby a first transit-number field is adapted to receive magnetic information describing routing information for electronic processing of said document, a second on-us field is adapted to receive magnetic information describing account information, and a third amount field is adapted to receive magnetic information describing said specified amount;

forming a three dimensional light diffracting image on an optical strip;

continuously rolling said strip onto a surface of said check wherein said strip is affixed to said surface of said check, said strip being positioned to extend from a top edge of the check to a bottom edge of the check and through a portion of said clear band; and printing an image onto said surface of said check, wherein a first portion of said image is printed on said strip, and a second portion of said image is printed on said surface of said check.

16. The method recited in claim 15 wherein said each of said three information fields comprises magnetic information.

17. The method recited in claim 15, wherein said step of affixing said strip to said surface comprises applying a heated pressure roller to said strip, and removing a plastic carrier.

18. The method recited in claim 17, wherein said substrate is paper.

19. The method recited in claim 15, wherein said step of forming said three dimensional light diffracting image comprises casting a light diffracting optically variable device onto a plastic carrier, creating a metalized side by applying a metallic layer to said optically variable device, and applying a heat set adhesive to said metalized side, wherein said plastic carrier is removed before said step of printing.

20. The method recited in claim 19, wherein said step of affixing said strip to said surface comprises applying a heated pressure roller to said strip, and removing said plastic carrier.

* * * * *